US010734943B2

(12) United States Patent
Frantz et al.

(10) Patent No.: US 10,734,943 B2
(45) Date of Patent: Aug. 4, 2020

(54) PHOTOVOLTAICS OPTIMIZED FOR LASER REMOTE POWER APPLICATIONS AT EYE-SAFER WAVELENGTHS

(71) Applicants: Jesse A. Frantz, Landover, MD (US); Jason D. Myers, Alexandria, VA (US); Steven R. Bowman, Edgewater, MD (US); L. Brandon Shaw, Woodbridge, VA (US); Jasbinder S. Sanghera, Ashburn, VA (US)

(72) Inventors: Jesse A. Frantz, Landover, MD (US); Jason D. Myers, Alexandria, VA (US); Steven R. Bowman, Edgewater, MD (US); L. Brandon Shaw, Woodbridge, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 14/850,465

(22) Filed: Sep. 10, 2015

(65) Prior Publication Data

US 2016/0079810 A1    Mar. 17, 2016

Related U.S. Application Data

(60) Provisional application No. 62/049,765, filed on Sep. 12, 2014.

(51) Int. Cl.
*H02S 10/00* (2014.01)
*H02S 40/38* (2014.01)
(Continued)

(52) U.S. Cl.
CPC ............... *H02S 40/38* (2014.12); *H02S 10/00* (2013.01); *H02S 20/00* (2013.01); *H02S 40/345* (2014.12); *B64C 2201/06* (2013.01); *Y02E 10/50* (2013.01)

(58) Field of Classification Search
CPC .......... H02J 17/00; H02S 10/00; H02S 20/00; H02S 40/345; H02S 40/38; B64C 2201/06; Y02E 10/50
(Continued)

(56) References Cited

U.S. PATENT DOCUMENTS 4,740,047 A * 4/1988 Abe .................... A61B 1/07
385/31
5,260,639 A * 11/1993 De Young ............ B64G 1/422
322/2 R
(Continued)

OTHER PUBLICATIONS

T. J. Nugent, and J. T. Kare, "Laser power for UAVs," white paper from LaserMotive, LLC, downloaded from: <http://lasermotive.com/2010/05/03/power-beaming-for-uavs-white-paper-release/> on Dec. 6, 2013.
(Continued)

*Primary Examiner* — Thienvu V Tran
*Assistant Examiner* — Brian K Baxter
(74) *Attorney, Agent, or Firm* — U.S. Naval Research Laboratory (57) ABSTRACT

A system for transmitting power to a remote equipment, the system including a first laser source that generates a first laser beam; a first tracking device operatively connected to the first laser source, wherein the first tracking device controls a direction of the first laser beam; and a first photovoltaic device operatively connected to the remote equipment located remotely from the first laser source and the first tracking device, wherein the first photovoltaic device includes a semiconductor material that generates an
(Continued)

electric current in response to absorbing the first laser beam, and wherein a first wavelength of the first laser beam is within an eye-safer range.

18 Claims, 7 Drawing Sheets

(51) Int. Cl.
*H02S 40/34* (2014.01)
*H02S 20/00* (2014.01)

(58) Field of Classification Search
USPC .......................................................... 307/104
See application file for complete search history.

(56) References Cited

U.S. PATENT DOCUMENTS

| | | | | |
|---|---|---|---|---|
| 6,364,253 | B1* | 4/2002 | Cavanagh | B64C 13/20 244/190 |
| 6,407,535 | B1* | 6/2002 | Friedman | B64D 41/00 244/1 R |
| 7,941,022 | B1* | 5/2011 | Schaffner | G02B 6/03633 385/123 |
| 8,953,647 | B1* | 2/2015 | Mead | H01S 3/06754 12/94 |
| 9,327,810 | B2* | 5/2016 | Zediker | B63G 8/001 |
| 9,684,077 | B2* | 6/2017 | Mead | G01S 17/89 |
| 9,920,706 | B1* | 3/2018 | Yavid | F02G 1/02 |
| 2002/0045999 | A1* | 4/2002 | Bollweg | F41G 3/2655 702/158 |
| 2002/0046763 | A1* | 4/2002 | Berrios | H02J 7/35 136/244 |
| 2004/0166681 | A1* | 8/2004 | Iles | H01L 31/0687 438/689 |
| 2005/0096800 | A1* | 5/2005 | Tanielian | B64C 39/024 701/2 |
| 2005/0103943 | A1* | 5/2005 | Tanielian | B64C 39/024 244/190 |
| 2005/0190427 | A1* | 9/2005 | Steinsiek | B64G 1/428 359/237 |
| 2008/0023060 | A1* | 1/2008 | Grumazescu | H01L 31/0543 136/246 |
| 2008/0077198 | A1* | 3/2008 | Webb | A61N 5/0618 607/88 |
| 2008/0224034 | A1* | 9/2008 | Wollstein | B63C 9/0005 250/302 |
| 2008/0275572 | A1* | 11/2008 | Tillotson | B60L 8/00 700/1 |
| 2009/0052288 | A1* | 2/2009 | Eno | G01S 7/4813 369/53.11 |
| 2009/0272424 | A1* | 11/2009 | Ortabasi | H01L 31/0543 136/246 |
| 2010/0186806 | A1* | 7/2010 | Morikawa | B32B 17/10018 136/256 |
| 2011/0039072 | A1* | 2/2011 | Grzybowski | C03B 23/02 428/156 |
| 2011/0108082 | A1* | 5/2011 | Werthen | H01L 31/0693 136/244 |
| 2012/0020631 | A1* | 1/2012 | Rinzler | G02B 6/4402 385/109 |
| 2012/0266803 | A1* | 10/2012 | Zediker | B63G 8/001 114/337 |
| 2012/0273470 | A1* | 11/2012 | Zediker | B23K 26/14 219/121.61 |
| 2013/0011102 | A1* | 1/2013 | Rinzler | G02B 6/3813 385/89 |
| 2013/0128271 | A1* | 5/2013 | Smith | G01N 21/39 356/437 |
| 2014/0060616 | A1* | 3/2014 | Okandan | B64G 1/443 136/244 |
| 2014/0307253 | A1* | 10/2014 | Lehman | G01J 1/56 356/213 |
| 2014/0340487 | A1* | 11/2014 | Gilliland | G01S 7/4863 348/48 |
| 2015/0029581 | A1* | 1/2015 | Fan | H01S 3/1616 359/341.31 |
| 2015/0187971 | A1* | 7/2015 | Sweeney | H01L 31/03046 307/151 |
| 2015/0311755 | A1* | 10/2015 | Hiebl | H02J 17/00 250/205 |

OTHER PUBLICATIONS

"Amazon Prime Air," press release, downloaded from: <http://www.amazon.com/b?node=8037720011> on Jun. 16, 2013.

J. A. Zuclich, D. A. Gagllano, F. Cheney, B.E. Stuck, H. Zwick, P. Edsall, and D. J. Lund, "Ocular effects of penetrating IR laser wavelengths," Proc. SPIE, 2391, pp. 112-125 (May 1995).

* cited by examiner

PHOTOVOLTAICS OPTIMIZED FOR LASER REMOTE POWER APPLICATIONS AT EYE-SAFER WAVELENGTHS

CROSS-REFERENCE TO RELATED APPLICATIONS

This application claims priority to U.S. Provisional Patent Application No. 62/049,765 filed on Sep. 12, 2014, the complete disclosure of which, in its entirety, is herein incorporated by reference.

GOVERNMENT INTEREST

The embodiments described herein may be manufactured, used, and/or licensed by or for the United States Government without the payment of royalties thereon.

BACKGROUND

Technical Field

The embodiments herein relate to remotely providing electrical power, and more particularly to supplying power to photovoltaics by lasers.

Description of the Related Art

The use of unmanned aerial vehicles (UAVs) for both military and civilian applications has increased rapidly during the past several years and is expected to continue to expand. Power for these platforms is typically provided by fossil fuels or batteries charged before the UAV is deployed. The availability of electrical power may limit UAV mission lifetime as well as mission scope.

SUMMARY

In view of the foregoing, an embodiment herein provides a system for transmitting power to remote equipment, the system comprising: a first laser source that generates a first laser beam; a first tracking device operatively connected to the first laser source, wherein the first tracking device controls a direction of the first laser beam; and a first photovoltaic device operatively connected to the remote equipment located remotely from the first laser source and the first tracking device, wherein the first photovoltaic device comprises a semiconductor material that generates an electric current in response to absorbing the first laser beam, and wherein a first wavelength of the first laser beam is within an eye-safer range.

The eye-safer range for the first wavelength of the first laser beam may be greater than approximately 1.5 µm. The semiconductor material in the first photovoltaic device may comprise a bandgap below 0.85 eV. The first wavelength of the first laser beam may be approximately 1550 nm. The semiconductor material may comprise any of Ge, InN, GaSb, PbS, PbSe, PbTe, InAs, $FeS_2$, $Ag_2S$, and SnS. The semiconductor material may comprise any of alloys $Si_{1-x}Ge_x$, $In_xGa_{1-x}As$, $Al_xIn_{1-x}As$, and $GaAs_{1-x}Sb_x$. The first tracking device may aim the first laser beam to the first photovoltaic device. The remote equipment may comprise any of an unmanned aerial vehicle, a ground-based vehicle, and a water-based vehicle.

The system may further comprise a heat sink operatively connected to the first photovoltaic device. The remote equipment may comprise an energy source operatively connected to the first photovoltaic device. The energy source may comprise any of a battery, a fuel cell, a wind power device, and a second photovoltaic device optimized to collect sunlight. The first laser beam may comprise any of a continuous wave and a pulsed beam. The first laser source may comprise any of $Er^{3+}$, $Ho^{3+}$, and $Tm^{3+}$ rare-Earth ions.

The system may further comprise a second laser source that generates a second laser beam; and a second tracking device operatively connected to the second laser source, wherein the second tracking device controls a direction of the second laser beam, wherein the remote equipment is configured to move from a first range of the first laser beam to a second range of the second laser beam, and wherein the first photovoltaic device generates the electric current in response to absorbing any of the first laser beam and the second laser beam, thereby extending an operation area of the remote equipment.

Another embodiment herein provides a device for receiving power on the remote equipment, the device comprising: a first photovoltaic cell array operatively connected to the remote equipment, wherein the first photovoltaic cell array comprises a semiconductor material that generates an electric current in response to absorbing a laser beam, and wherein a wavelength of the laser beam is within an eye-safer range. The eye-safer range for the wavelength of the laser beam may be greater than approximately 1.5 µm. The first photovoltaic cell array may comprise a semiconductor material comprising a bandgap below 0.85 eV. The semiconductor material may comprise any of Ge, InN, GaSb, PbS, PbSe, PbTe, InAs, $FeS_2$, $Ag_2S$, and SnS. The semiconductor material may comprise any of alloys $Si_{1-x}Ge_x$, $In_xGa_{1-x}As$, $Al_xIn_{1-x}As$, and $GaAs_{1-x}Sb_x$.

Another embodiment herein provides a method for transmitting power to the remote equipment, the method comprising: generating a laser beam using a laser source; and aiming the laser source, using a tracking device operatively connected to the laser source, at a photovoltaic device operatively connected to the remote equipment, wherein the photovoltaic device comprises a semiconductor material that generates an electric current in response to absorbing the laser beam, and wherein a wavelength of the laser beam is within an eye-safer range. The eye-safer range for the wavelength of the laser beam may be greater than approximately 1.5 µm, and wherein the semiconductor material in the photovoltaic device comprises a bandgap below 0.85 eV.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It is desirable to transmit power to remote vehicles or equipment, for example UAVs, via laser beams. The need exists for transmitting power via laser for applications such as scene surveillance near naval vessels, localized intelligence gathering, recharging remote vehicles without landing, docking or returning to base and multiple beaming-laser long range operation (e.g., in an urban environment). The embodiments herein provide a photovoltaic device optimized for laser remote power applications at eye-safer wavelengths. Referring now to the drawings, and more particularly to FIGS. 1A through 6, where similar reference characters denote corresponding features consistently throughout the figures, there are shown preferred embodiments.

Figure 1A:
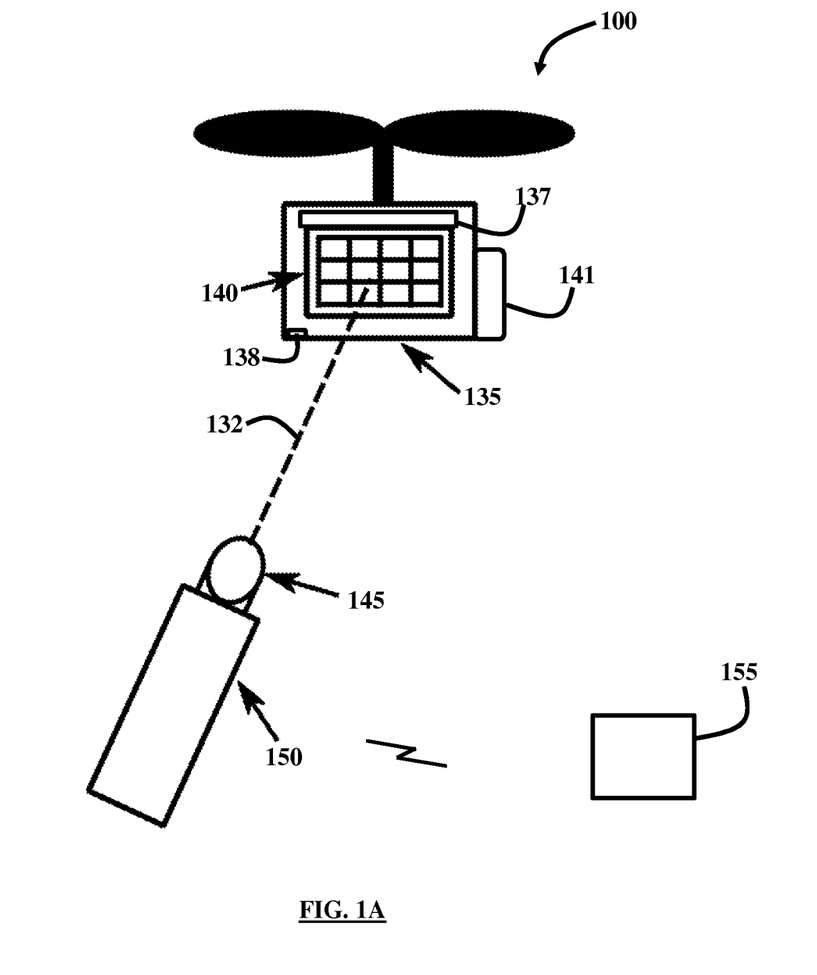
FIG. 1A is a schematic diagram illustrating a laser power transmitting system according to an embodiment herein.

FIG. 1A is a schematic diagram illustrating a laser power transmitting system 100 according to an embodiment. Transmitting power to a UAV 135 via a laser beam 132 in conjunction with a photovoltaic (PV) device 140 mounted to the UAV 135 may provide an appealing alternative or supplement to other power sources for the UAV 135.

Laser power transmission at microwave wavelengths may be impractical due to beam spread. Laser power beaming to UAV 135 may use near infra-red (NIR) laser diode arrays. However, laser power beaming in the NIR may be hazardous, because the beam can be reflected and scattered toward bystanders, causing retinal hazards for humans, and the human eye has a low damage threshold at NIR wavelengths. For example, lasers near 1 µm in wavelength may be in a range that is especially hazardous to the human eye due its low threshold for retinal damage in this region. Therefore, laser power beaming in the NIR may be unsuitable for real battlefield military and/or civilian applications.

Lasers with wavelengths further into the infrared range, for example in the 1.5-2.5 µm wavelength range, may be far less hazardous to human eyes. A laser in the 1.5-2.5 µm wavelength range may have damage thresholds 2-3 orders of magnitude higher than for 1 µm lasers. A wavelength range from approximately 1.5 µm to approximately 2.5 µm is referred to herein as "eye-safer" wavelengths. Light in this range, however, may not be efficiently absorbed by some conventional photovoltaic absorbers, for example silicon (Si).

It is desirable to transmit power to UAVs via laser beams in an eye-safer wavelength range. There is a large commercial market, as well as, a military market and a security market for power beaming devices, using the eye-safer laser wavelengths. In an embodiment herein, the laser power beaming system 100 provides electrical power to the UAV 135 by use of an eye-safer laser source 150, operating at an eye-safer wavelength. In an embodiment, photovoltaic device 140 includes a photovoltaic optimized for eye-safer wavelengths (POESL).

In an embodiment, the direction of the laser beam 132 may be controlled with an automated tracking system 145. A remote communications component 155 may remotely control laser source 150 and the automated tracking system 145. In an embodiment, the tracking system 145 aims the laser beam at the photovoltaic device 140 which is mounted on the UAV 135. The tracking system may keep the laser beam 132 directed toward the photovoltaic device 140 as the UAV 135 and laser beam 132 move relative to each other. In an embodiment, the photovoltaic device 140 is mounted appropriately to a heat sink 137 in order to dissipate excess heat. The photovoltaic device 135 may convert light from the laser beam 132 into electrical energy that is then provided to an electrical system or battery storage 138 of the UAV 135. In an embodiment, the photovoltaic device 140 is configured to efficiently absorb the eye-safer laser beam 132 generated by the eye-safer laser source 150. The power may be used immediately or stored in a battery 138 in the UAV 135 for later use.

Figure 1B:
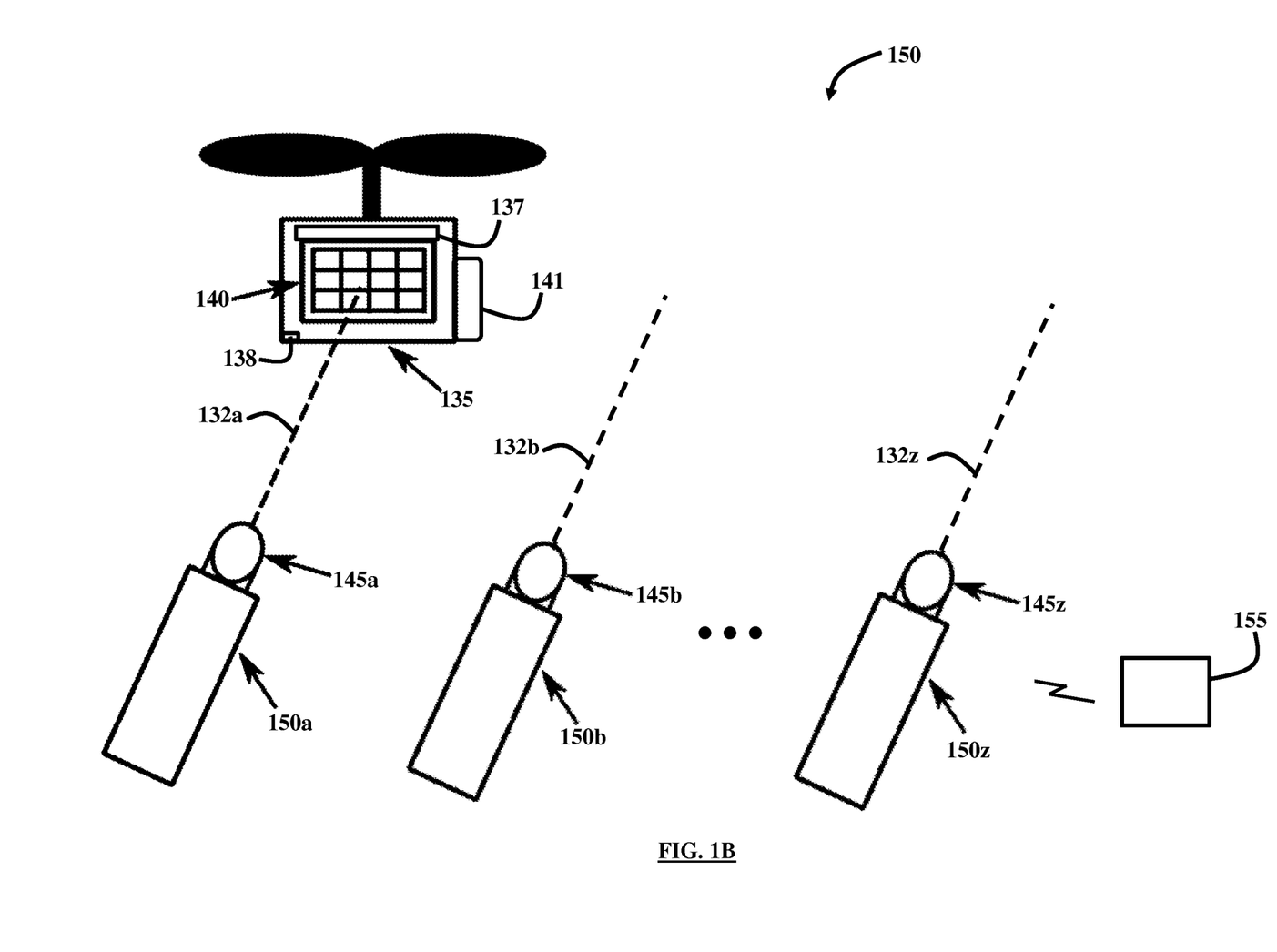
FIG. 1B is a schematic illustrating a multiple beaming laser system according to an embodiment herein.

FIG. 1B, with reference to FIG. 1A, is a schematic illustrating a multiple beaming laser system 150 according to an embodiment. The multiple beaming laser system 150 may be used in a long range operation of the UAV 135. Any number of laser sources 150a, 150b, . . . 150z may be sufficiently spaced and configured to generate respective laser beams 132a, 132b, . . . 132z, so that the UAV 135 passes into a range of multiple laser beams during its operation. This can result in longer range for the UAV 135 than the example embodiment of FIG. 1A having one laser beam 145. In an embodiment, laser sources 150a, 150b, . . . 150z, are eye-safer laser sources that operate at an eye-safer wavelength. In an embodiment, laser beams 132a, 132b, . . . 132z may be controlled with automated tracking systems 145a, 145b, . . . 145z, respectively. The remote communications component 155 may remotely control laser sources 150a, 150b, . . . 150z, and the automated tracking systems 145a, 145b, . . . 145z.

Several applications for UAV 135 may be well suited to use a power source using eye-safer laser beam 132 generated by the eye-safer laser source 150. The applications may allow for the UAV 135 to stay within range of the laser beam 132 for extended periods. The applications include:

(I) Scene surveillance near a naval vessel—the UAV 135 may fly near a ship at an altitude sufficient to capture data for a larger area than can be surveyed near the surface. The UAV 135 may be deployed at times to fly further from the ship for various purposes. The UAV 135 may receive power using the laser power beaming system 100.

(II) Localized intelligence gathering—the UAV 135 may be deployed for intelligence gathering in a zone where its flight path keeps it within laser range. The UAV 135 may receive power using the laser power beaming system 100.

(III) The UAV 135 can be deployed on missions but returns to a location near the beaming laser for recharging and can thus carry out multiple missions without the need for landing and take-off in between them. The UAV 135 may receive power for recharging using the laser power beaming system 100.

(IV) In a commercial package delivery system, packages may be delivered to a house using a UAV 135. A potential limitation of such package delivery system may be the short range of battery powered UAVs. This package delivery application may be well suited for using the power transmission system 150 to use multiple lasers 132*a*, 132*b*, . . . 132*z* to extend the range of a package delivery drone.

The UAV 135 may rely on hybrid power where a portion of its power is derived from the photovoltaic device 140 that receives laser beam 132, and the rest may be derived from another power source 141 such as an upward-facing photovoltaic cell optimized to collect sunlight. The second power source 141 could alternately be a battery, a fuel cell, wind power, or any other suitable power source.

The UAV 135 in systems 100, 150 may include passive or active countermeasures to prevent damage to the photovoltaic device 140 by hostile attacks. An example of a passive countermeasure is an optical filter covering the photovoltaic device 140. The optical filter is configured to filter the incident light before reaching the photovoltaic device 140. In an embodiment, the optical filter may be configured to transmit the laser beam 132 but reflect light at other wavelengths, preventing damage to the photovoltaic device 140 from a laser originating from a hostile force. An example of an active countermeasure is a system that detects light from a hostile laser and then blocks this light by employing an opaque shield to cover the photovoltaic device 140. The systems 100, 150 may be used to provide remote power to any of a ground-based, air-based, and water-based vehicle or equipment, rather than the UAV 135. For each application, the laser source 150 may be based on land, on a floating platform, or on another aerial vehicle. The laser beam 132 may be either a continuous wave or pulsed laser. It may be a laser diode array, fiber laser, or thin disk laser. The laser source 150 may employ emission from a rare-Earth ion including erbium, holmium, or thulium ($Er^{3+}$, $Ho^{3+}$, or $Tm^{3+}$).

Figure 2A:
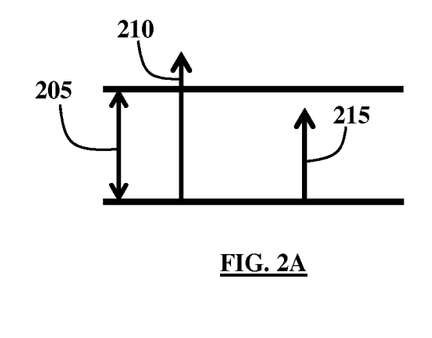
FIG. 2A is a schematic diagram illustrating a band gap of a conventional photovoltaic material.

FIG. 2A, with reference to FIGS. 1A and 1B, is a schematic diagram illustrating a band gap 205 of a conventional photovoltaic material. A conventional photovoltaic material may be, for example, Si. Si, with a band gap 205 of 1.1 electron volts (eV), can efficiently absorb a laser beam 215 with 1 μm wavelength (corresponding to 1.24 eV). However, the band gap 205 of Si is too large to absorb the eye-safer laser beam 215 with 1.5 μm wavelength (corresponding to 0.83 eV).

Figure 2B:
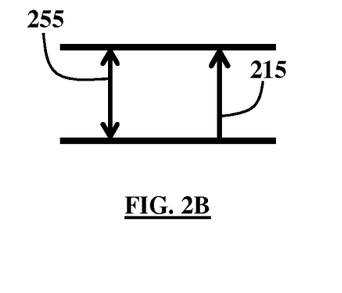
FIG. 2B is a schematic diagram illustrating a band gap of a narrow band gap material according to an embodiment herein.

FIG. 2B, with reference to FIGS. 1A through 2A, illustrates a band gap 255 of a narrow band gap material, according to an embodiment herein. In an embodiment, the narrow band gap material is germanium (Ge). Ge, with its narrower band gap 255 of 0.66 eV, is capable of absorbing the eye-safer laser beam 215 with 1.5 μm wavelength. Ge is used as an example herein. In other embodiments, any semiconductor with a suitable narrow band gap could be employed. For example, any semiconductor with a band gap less than 0.85 eV may be used to absorb an eye-safer laser beam. Therefore a narrow band gap semiconductor may be optimized for use as a single junction device for use in the POESL such as photovoltaic device 140.

In additional exemplary embodiments, the photovoltaic device 140 used in the POESL can be any material with a band gap in the range of 0.2 eV to 0.85 eV. These materials include the semiconductors germanium (Ge), indium nitride (InN), gallium antimonide (GaSb), lead sulfide (PbS), lead selenide (PbSe), lead telluride (PbTe), indium arsenide (InAs), iron disulfide ($FeS_2$), silver sulfide ($Ag_2S$), and tin sulfide (SnS). These materials can also include the alloys silicon-germanium ($Si_{1-x}Ge_x$), indium gallium arsenide ($In_xGa_{1-x}As$), aluminum indium arsenide ($Al_xIn_{1-x}As$), and gallium arsenide antimonide ($GaAs_{1-x}Sb_x$). A semiconductor with a wider band gap than the laser photon energy may be used in the photovoltaic device 140 in conjunction with a material that results in up-conversion to an energy larger than that of the semiconductor's band gap.

Figure 3:
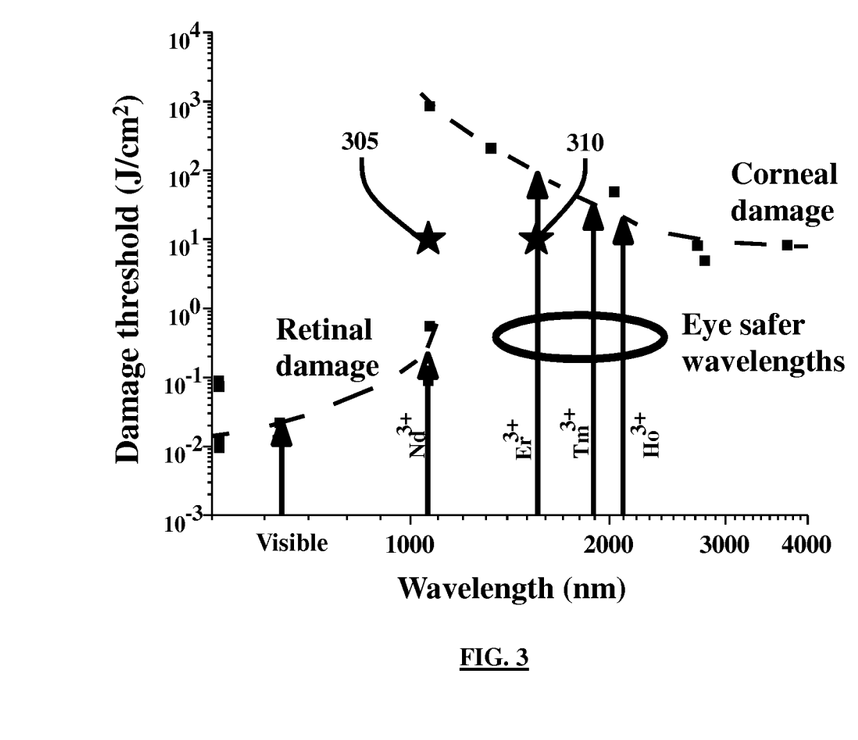
FIG. 3 is a graph illustrating ocular damage vs. wavelength of a laser beam according to an example herein.

FIG. 3, with reference to FIGS. 1A through 2B, is a graph illustrating ocular damage vs. wavelength of a laser beam, according to an example herein. Radiant exposure from a laser beam may refer to the energy per unit area received from the laser that is incident on a surface. The radiant exposure of laser 305 required in conventional photovoltaic laser beaming technology is above the threshold for ocular damage. The radiant exposure of a laser 310 used with the photovoltaic laser beaming technology according to an embodiment herein is below the ocular damage threshold.

The exemplary laser power beaming operation illustrated in FIG. 3 assumes a continuous wave laser and a one second (1 s) ocular exposure. Point 305 in FIG. 3 illustrates radiant exposure corresponding to a conventional laser beam. Point 310 in FIG. 3 illustrates radiant exposure corresponding to a photovoltaic laser beam in the 1.5-2.5 μm wavelength range, according to an exemplary embodiment herein. Both laser beams in FIG. 3 operate with a power rating of 1 kW and are directed to a 10×10 cm photovoltaic array. For the laser beam corresponding to the point 305, the photovoltaic array may be a Si photovoltaic array. For the laser beam corresponding to the point 310, the 10×10 cm photovoltaic array may be a Ge photovoltaic array. The wavelength of laser corresponding to the point 305 is chosen to be approximately 1.06 μm because of the availability of high-power NIR lasers and because typical solar cells employ Si or GaAs photovoltaics that can efficiently absorbs light in this region. The beaming lasers, however, are typically approximately 1 kW or higher power lasers or laser arrays. These lasers pose a serious safety risk to humans who could be exposed either directly or due to reflection or scattering.

Figure 4:
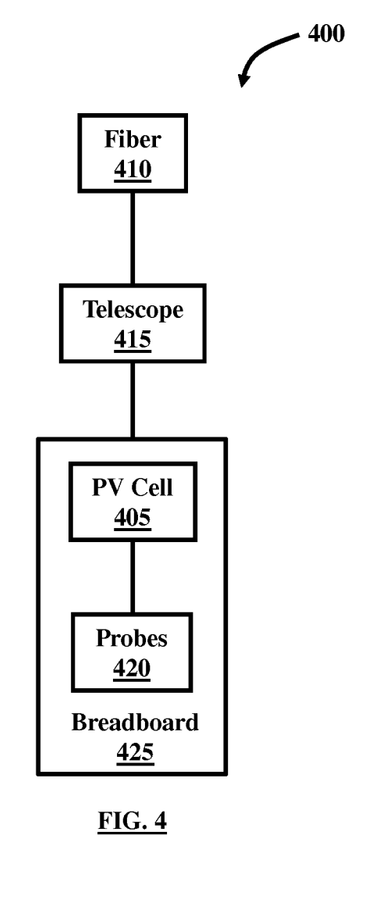
FIG. 4 is a block diagram of an example system using a photovoltaic cell according to an embodiment herein.

FIG. 4, with reference to FIGS. 1A through 3, is a block diagram of an example system 400 using a Ge photovoltaic cell 405 according to an embodiment herein. The system 400 may include a fiber 410, a telescope 415, and probes 420. In an embodiment, probes 420 include two probes. In an embodiment, breadboard 425 may hold the Ge photovoltaic cell 405 and the probes 420. Fiber 410 may be used to guide a laser signal, and the telescope 415 may be configured to collimate the laser signal and direct it on the Ge photovoltaic cell 405. Ge photovoltaic cell 405 produces an electric signal in response to the laser signal from fiber 410. Probes 420 may be used to measure the electrical current generated by the Ge photovoltaic cell 405.

Figure 5:
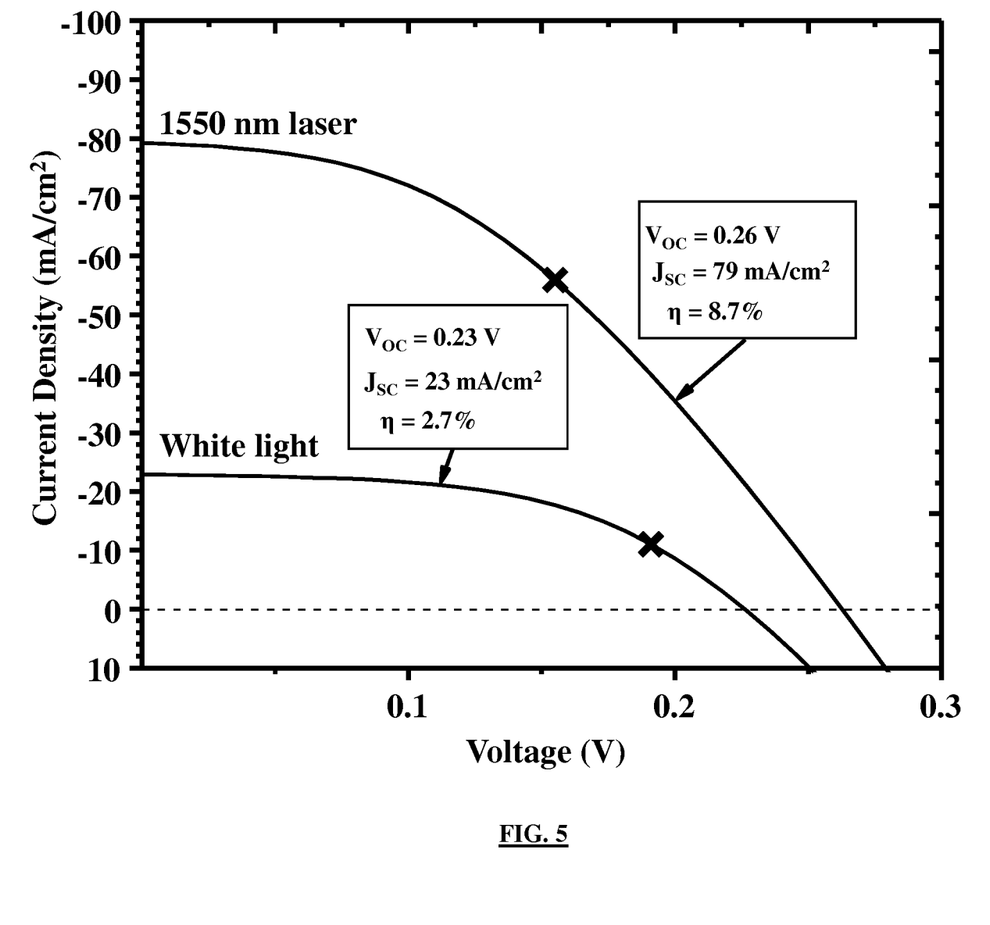
FIG. 5 is a graph illustrating electrical current density vs. voltage generated by a Ge photovoltaic cell according to an example herein.

FIG. 5, with reference to FIGS. 1A through 4, is a graph illustrating electrical current density versus voltage generated by the Ge photovoltaic cell 405 of FIG. 4. FIG. 5 illustrates electrical current density versus voltage for the Ge photovoltaic cell 405, in the example system 400, operated under a white light (AM 1.5 illumination) and operated under a 1550 nm laser illumination that provides high current density. When the example system 400 operates under white light, the fiber 410 and the telescope 415 are replaced with a collimated white light source. The X's on the graph in FIG. 5 show the respective points of maximum power. The graph of FIG. 5 shows that the power generated by the Ge photovoltaic cell 405 operated under the 1550 nm laser illumination is greater that when the Ge photovoltaic cell 405 is operated under the white light (AM 1.5 illumination) illumination. In the graph, $V_{OC}$ represents the open circuit voltage, $J_{SC}$ represents the short circuit current, and η represents the optical to electrical power conversion efficiency.

Figure 6:
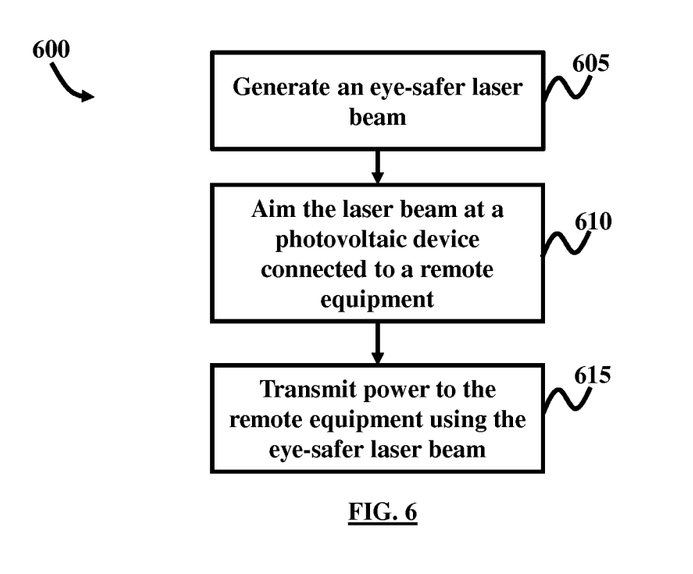
FIG. 6 is a flow diagram illustrating a method for transmitting power to remote equipment according to an embodiment herein.

FIG. 6, with reference to FIGS. 1A through 5, is a flow diagram illustrating a method 600 for transmitting power to remote equipment, for example the UAV 135, according to an embodiment herein. At step 605, method 600 generates an eye-safer laser beam 132. At step 610, method 600 aims the eye-safer laser beam 132 at the photovoltaic device 140 of the remote equipment (e.g., UAV 135). At step 615, method 600 transmits power to the remote equipment (e.g., UAV 135) using the eye-safer laser beam 132.

The embodiments herein provide systems, methods, and devices for recharging batteries 138 on remote vehicles, such as UAV 135, while the UAV 135 is in operational mission status, such as scene surveillance, intelligence gathering, and target acquisition and disposition. In an embodiment, multiple beam lasers 132a, 132b, . . . 132z, can be deployed so that the UAV 135 passes a range of the multiple lasers during operation, recharging the batteries 138 of the UAV 135 and thus, providing longer range operational capabilities. In addition, the range of wavelengths of the lasers is safe for human operators and observers and bystanders.

Some components of the embodiments herein can include a computer program product configured to include a pre-configured set of instructions stored in non-volatile memory, which when performed, can result in actions as stated in conjunction with the methods described above. For example, any of the laser source 150, the remote communications component 155, the automated tracking system 145, or the UAV 135 may include computer processor(s) or specialized computer software code. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for laser power beaming to remote equipment, comprising:
   a first laser source that generates a high-power first laser beam;
   a first tracking device operatively connected to said first laser source, wherein said first tracking device is constructed to track the motion of said remote equipment and control a direction of laser power beaming of said high-power first laser beam such that said high-power first laser beam is incident on said remote equipment as said remote equipment moves;
   a first photovoltaic device operatively connected to said remote equipment, where the first photovoltaic device is located remotely from said first laser source and said first tracking device;
   a second laser source that generates a high-power second laser beam; and
   a second tracking device operatively connected to said second laser source,
   wherein said first photovoltaic device comprises a semiconductor material that generates an electric current in response to absorbing laser power from said high-power first laser beam, and wherein a first wavelength of said high-power first laser beam is within an eye-safer range greater than approximately 1.5 μm, and
   wherein said second tracking device is constructed to track the motion of said remote equipment and control a direction of laser power beaming of said high-power second laser beam such that said high-power second laser beam is incident on said remote equipment as said remote equipment moves into a range of said high-power second laser beam and out of a range of said high-power first laser beam, and
   wherein said first photovoltaic device is configured to generate electric current in response to absorbing laser power from said high-power second laser beam.

2. The system of claim 1, wherein said semiconductor material in said first photovoltaic device comprises a bandgap below 0.85 eV.

3. The system of claim 1, wherein said first wavelength of said high-power first laser beam is approximately 1550 nm.

4. The system of claim 1, wherein said semiconductor material comprises any of Ge, InN, GaSb, PbS, PbSe, PbTe, InAs, $FeS_2$, $Ag_2S$, and SnS.

5. The system of claim 1, wherein said semiconductor material comprises any of alloys $Si_{1-x}Ge_x$, $In_xGa_{1-x}As$, $Al_xIn_{1-x}As$, and $GaAs_{1-x}Sb_x$.

6. The system of claim 1, wherein said first tracking device is constructed to control the direction of laser power beaming of said high-power first laser beam such that said high-power first laser beam is incident on said first photovoltaic device of said remote equipment as said remote equipment moves.

7. The system of claim 1, wherein said remote equipment comprises any of an unmanned aerial vehicle, a ground-based vehicle, and a water-based vehicle.

8. The system of claim 1, further comprising a heat sink operatively connected to said first photovoltaic device.

9. The system of claim 1, wherein said remote equipment comprises an energy source operatively connected to said first photovoltaic device.

10. The system of claim 9, wherein said energy source comprises any of a battery, a fuel cell, a wind power device, and a second photovoltaic device optimized to collect sunlight.

11. The system of claim 1, wherein said high-power first laser beam comprises any of a continuous wave and a pulsed beam.

12. The system of claim 1, wherein said first laser source comprises any of $Er^{3+}$, $Ho'$, and $Tm^{3+}$ rare-Earth ions.

13. The system of claim 1, further comprising:
   an optical filter covering said photovoltaic device, wherein said optical filter is configured to transmit the wavelength of said high-power first laser beam and reflect light of other wavelengths.

14. The system of claim 1, wherein said high-power first laser beam has a power of approximately 1 kW or higher.

15. The system of claim 1, wherein a wavelength of the high-power second laser beam is within an eye-safer range greater than approximately 1.5 µm.

16. A method for laser power beaming to remote equipment, the method comprising:
   directing a high-power first laser beam, generated by a first laser source, to a photovoltaic device connected to remote equipment, wherein the remote equipment is tracked by a tracking device operatively connected to the first laser source and the high-power first laser beam is moved under control of the tracking device such that the high-power first laser beam is incident on the photovoltaic device as the remote equipment moves;
   directing a high-power second laser beam, generated by a second laser source, to the photovoltaic device connected to the remote equipment, wherein the remote equipment is tracked by a second tracking device operatively connected to the second laser source and the high-power second laser beam is moved under the control of the second tracking device such that the high-power second laser beam is incident on the photovoltaic device as the remote equipment moves into a range of the high-power second laser beam and out of a range of the high-power first laser beam,
   wherein said photovoltaic device comprises a semiconductor material that generates an electric current in response to absorbing laser power beamed from the high-power first laser beam or the high-power second laser beam, and
   wherein a wavelength of the high-power first laser beam is within an eye-safer range greater than approximately 1.5 µm.

17. The method of claim 16, wherein the semiconductor material in the photovoltaic device comprises a bandgap below 0.85 eV.

18. The method of claim 16, wherein a wavelength of the high-power second laser beam is within an eye-safer range greater than approximately 1.5 µm.

* * * * *